(12) United States Patent
Cousin et al.

(10) Patent No.: US 7,790,842 B2
(45) Date of Patent: Sep. 7, 2010

(54) POLYMER TREATMENT (75) Inventors: Frederic Cousin, Sint-Genesius-Rode (BE); Brent Walworth, Sint-Niklaas (BE); Daniel Marissal, Carry le Rouet (FR)

(73) Assignee: Ineos Manufacturing Belgium NV, Antwerp (BE)

( * ) Notice: Subject to any disclaimer, the term of this patent is extended or adjusted under 35 U.S.C. 154(b) by 0 days.

(21) Appl. No.: 12/289,535

(22) Filed: Oct. 29, 2008

(65) Prior Publication Data
US 2009/0124779 A1 May 14, 2009

Related U.S. Application Data (62) Division of application No. 10/531,481, filed on Apr. 7, 2006.

(51) Int. Cl.
C08F 6/00 (2006.01)
C08J 3/00 (2006.01)

(52) U.S. Cl. .................. 528/480; 422/132; 422/135; 528/481; 528/501

(58) Field of Classification Search .............. 422/132, 422/135; 528/480, 481, 501
See application file for complete search history.

(56) References Cited

U.S. PATENT DOCUMENTS

| | | | |
|---|---|---|---|
| 3,227,703 A | 1/1966 | Copenhaver, Jr. et al. | |
| 3,799,234 A | 3/1974 | Skidmore | |
| 3,920,624 A * | 11/1975 | Humkey et al. | 528/501 |
| 4,372,758 A | 2/1983 | Bobst et al. | |
| 4,501,885 A | 2/1985 | Sherk et al. | 528/501 |
| 4,710,538 A | 12/1987 | Jorgensen | 525/53 |
| 4,758,654 A | 7/1988 | Brod et al. | |
| 4,958,006 A | 9/1990 | Bernier et al. | 528/501 |
| 5,182,870 A | 2/1993 | Dighton et al. | |
| 5,462,351 A | 10/1995 | Royal | |
| 5,462,531 A | 10/1995 | Novacek et al. | |
| 5,769,927 A | 6/1998 | Gottschlich et al. | |
| 5,955,569 A | 9/1999 | Dujari et al. | |
| 6,214,903 B1 | 4/2001 | Eisinger et al. | |
| 6,218,504 B1 | 4/2001 | Dolle et al. | |
| 6,271,319 B1 | 8/2001 | Baker et al. | 526/68 |
| 6,858,682 B2 | 2/2005 | Kendrick et al. | 526/64 |

FOREIGN PATENT DOCUMENTS

| | | |
|---|---|---|
| CA | 836977 A | 3/1970 |
| DE | 42 16 960 A1 | 8/1993 |
| DE | 42 16 960 C2 | 8/1993 |
| EP | 0 047 077 A1 | 3/1982 |
| EP | 0 372 239 A2 | 6/1990 |
| EP | 0 683 176 A1 | 11/1995 |
| EP | 0 735 053 B1 | 10/1996 |
| EP | 0 801 081 A2 | 10/1997 |
| EP | 801081 | * 10/1997 |
| EP | 1381634 B1 | 11/2008 |
| JP | 54-52162 | 4/1979 |
| JP | 54-52162 B3 | 4/1979 |
| JP | 9-52918 | 2/1997 |
| WO | WO 97/16478 A1 | 5/1997 |
| WO | WO 98/40417 A1 | 9/1998 |
| WO | WO 99/65953 | 12/1999 |
| WO | WO 02/088194 A1 | 11/2002 |

OTHER PUBLICATIONS

Moore, S.J., et al; "Solubility of ethylene, 1-butene and 1-hexene in polyethylenes"; Chemical Engineering Science; vol. 56, pp. 4121-4129 (2001) (Front Page Only).

Borho, K., et al; "Zur Auslegung von Schachttrocknern"; Chem.-Ing. Tech; vol. 61, No. 3; pp. 246-248 (1989).

Dr.-Ing. D. Stockburger; et al; "Trocknungsverhalten von Kunststoffen"; Chem.-Ing. Tech 41, No. 7; p. 456 (1969) (Front Page Only).

Becker, "Trocknungsbehalter fur Kunststoffgranulate"; Schuttguttechnik in de Kunstoffindustrie, Dusseldorf, (ISBN 3-18-234213-4) pp. 235-249 (1998) (Front Page Only).

(Continued)

Primary Examiner—Terressa M Boykin
(74) Attorney, Agent, or Firm—Nixon Vanderhye (57) ABSTRACT

A process for the separation of volatile material from particulate polymer discharged from a polymerisation reactor in the form of a polymer slurry and which has been substantially freed from unreacted monomer in an earlier separation step, comprising
 (a) feeding the particulate polymer to a purge vessel and causing it to move through the vessel in substantially plug-flow mode,
 (b) heating the particulate polymer in the purge vessel to a temperature greater than 30° C. but insufficiently high to cause the particles to become agglomerated, and/or maintaining the polymer at a temperature in this range in the purge vessel,
 (c) feeding gas to the purge vessel to remove volatile material therefrom, removing the particulate polymer from the purge vessel,
wherein substantially all of the heating of the particles which occurs in the purge vessel is accomplished by preheating the gas fed into the purge vessel, and the polymer slurry discharged from the polymerization reactor is submitted to a pressure release such that diluent is evaporated and a polyolefin/gas mixture is formed in a collecting vessel, and a concentrator vessel is used between the collecting vessel and the purge vessel.

13 Claims, 2 Drawing Sheets

OTHER PUBLICATIONS

O1-Borealis AG; Notice of Opposition to European Patent No. EP-B-1381634; 14 pgs., dated 02-Hei-2009.

Stockburger, D., et al; "Trocknungsverhalten von Kunststoffen"; *Chemie.-Ing.-Techn*, vol. 41, No. 7, pp. 456-461 (1969).

Pittenger, B.H., et al; "Uniform Purging of Resins in Contact Bed Purge Vessels"; *Polymer Engineering and Science*; vol. 39, No. 9, pp. 1802-1811 (1999).

VDI Gesellschaft Kunststoffechink; "Schuttguttechnik in der Kunststoffindustrie", Neues und Bewahrtes, pp. 235-249 (1998).

Wilms, ECCE 1 Proceedings, vol. 3, pp. 1905-1908 (1997).

O2-Coperion GmbH; Notice of Opposition to European Patent No. EP 1 381 634 B1; 15 pgs., dated Jul. 7, 2009.

Beret, S.E., et al; "Purging Criteria for LDPE Make Bins"; *CEP*; pp. 44-49 (1977).

O3-Zeppelin Silos & Systems GmbH, European Patent No. 1 381 634 B1, dated Aug. 11, 2009 (25 pgs).

OPPO 3: Zeppelin Silos & Systems GmbH, Einspruch gegen EP 1 381 634 B1, Merkmalsanalyse.(1 pg).

O4-Dow The Chemical Company, Opposition against EP 1 381 634 B1, dated Aug. 13, 2009 (12 pgs).

Manjal, S., et al; "Mathematical Model and Experimental Investigation of Polycarbonate Pellet Drying"; *Polymer Engineering and Science*; vol. 30, No. 21; pp. 1352-1360 (1990).

Handbook of Chemistry and Physics, Robert C. Weast, Editor; CRC Press, Inc. (4 pgs) (1976-1977).

O5-Total Petrochemicals Research Feluy; Notice of Opposition to European Patent No. EP 1 381 634; (5 pgs.) dated Aug. 12, 2009.

Fax dated Jan. 16, 1998; from Katoen Natie NV to Fina Antwerp Olefins (5 pgs).

Letter dated May 12, 1998; from FinaChemicals Antwerpen to Gheys (1 pg).

Fax dated Mar. 18, 1998 from Gheys to FinaChemicals Antwer (5 pgs).

Letter dated May 12, 1998 from FinaChemicals Antwerpen to Werf & Vlasnatie (1 pg).

Fax dated Mar. 13, 1998 from Werf & Vlasnatie to Fina Chemicals PE (2 pgs).

O6-Sabic, Opposition to EP 1381634 B1, (10 pgs) dated Aug. 11, 2009.

Peacock, A.J.; "Handbook of Polyethylene"; pp. 43-66 (2000).

Vicat Softening Temperature—ISO 306: IDES—The Plastics Web® (2 pgs); (1986-2009).

Hagman, A., et al; "Quantitative Determinatin of Volatiles in Polyolefins by Dynamic Headspace/Capillary Gas Chromatography/Mass Spectrometry"; *Journal of High Resolution Chromatography & chromatography Communications*; pp. 830-836 (1988).

O7-Basell Poliolefine Italia S.r.l.; Notice of Opposition to European Patent No. EP-B-1381634, (17 pgs) dated Aug. 14, 2009.

\* cited by examiner

POLYMER TREATMENT

This application is a divisional of application Ser. No. 10/531,481, filed Apr. 7, 2006, the entire content of which is hereby incorporated by reference in this application.

The present invention relates to a process for the removal of volatile material from particulate polymer, and more especially to the removal of traces of volatile constituents from pelletised polymer, polymer powder or granular polymeric material.

Whilst the present invention can in principle be applied to any particulate polymer for the removal of volatiles therefrom, the following description refers primarily to the application of the process to the removal of volatiles from particulate polyolefins.

BACKGROUND OF THE INVENTION

Polyolefins prepared by catalytic polymerisation or copolymerisation of olefins, for example, ethylene, propylene or higher olefins such as $C_4$ to $C_{12}$ alpha-olefins, are generally subjected to a process for removal of the bulk of the unreacted monomer before being processed into useful articles. Such processes for removal of unreacted monomer generally involve a monomer separation and recovery procedure wherein the bulk of the unreacted monomer associated with the polyolefin product is separated therefrom when the polyolefin is first removed from the polymerisation reactor. Processes for this initial monomer separation and recovery depend on the particular technology being employed for the polymerisation reaction. For example, in the gas phase (co)polymerisation of olefins, the polyolefin product is normally a fine powder fluidised by, or stirred in, an atmosphere comprising the gaseous monomer(s). Monomer may be separated and recovered from the gas phase process, for example, by isolating a continuous stream of particulate polymer product associated with at least some gas, and optionally some liquid, comprising unreacted monomer; reducing the pressure and recycling the volatile components to the reactor; and purging the polymer component with inert gas, for example, nitrogen or carbon dioxide.

Thus the volatile materials referred to throughout this specification can be, for example, the monomer or monomers themselves, oligomers, any solvent or diluent used in the polymerisation, the catalyst materials or products derived therefrom, additives in the polymerisation (e.g. molecular weight regulators), impurities present in any of the materials used in the polymerisation, or materials employed for lubricating moving parts of the reactors. Such volatile substances can also arise from degradation or inter-reaction of the polymerisation components themselves and/or their products. The presence of such volatile substances in the final polymer is generally undesirable and can result, for example, in unwanted odour in articles manufactured therefrom, or can produce taint in foodstuffs packed in containers fabricated from the polymer, or in water from potable water piping systems. The presence of inflammable volatile materials can also present a fire or explosion hazard. Likewise, such volatile materials can have toxic, irritant or other undesirable pharmacological properties which normally render their removal desirable or even essential.

The production of volatile substances in the polymer can also occur during pelletisation of the polymer, for example, by thermal degradation of the polymer itself, or by the degradation of additives employed in the pelletising process.

GB-A-1272778 relates to a process for the removal of volatile constituents from particulate olefin polymers which have been produced by the gas phase polymerisation of the monomers for example of ethylene or propylene, by treating a layer of the polymer, whose particles have a mean diameter of from 10 to 5000 microns, with a stream of inert gas at a temperature of from at least +80° C., to at least 5° C. below the crystallite melting of the polymer in the treatment zone while keeping the layer in vigorous motion.

EP-A-0047077 relates to a process for removing unpolymerised gaseous monomers from solid olefin polymers by conveying the polymer (e.g. in granular form) to a purge vessel, contacting the polymer in the purge vessel with a countercurrent inert gas purge stream to strip away the monomer gases which are evolved from the polymer, and recycling a portion of the resulting inert gas-monomer gas stream to the purge vessel.

The present invention is concerned with an improved method for the removal of traces of volatile material, e.g. unreacted monomer, oligomers or other volatile constituents such as solvent or degradation products, from particulate polymeric materials, especially polymers prepared by the catalytic polymerisation of organic monomers.

SUMMARY OF THE INVENTION

In particular, the present invention is concerned with removal of volatile materials from particulate polymeric materials, preferably particulate polyolefins, which have previously been subjected to at least one process for separation of the unreacted monomer, for example, by processes such as those described in GB-A-1272778 and EP-A-047077.

The present invention provides a process for the separation of volatile material from particulate polymer which has been substantially freed from unreacted monomer in an earlier separation step, comprising (a) feeding the particulate polymer to a purge vessel and causing it to move through the vessel in substantially plug-flow mode, (b) heating the particulate polymer in the purge vessel to a temperature greater than 30° C. but insufficiently high to cause the particles to become agglomerated, and/or maintaining the polymer at a temperature in this range in the purge vessel, (c) feeding gas to the purge vessel to remove volatile material therefrom, removing the particulate polymer from the purge vessel, wherein substantially all of the heating of the particles which occurs in the purge vessel is accomplished by preheating the gas fed into the purge vessel. By "plug flow mode" is meant throughout this specification that the flow of particulate polymer through the relevant vessel occurs in such a manner that there is little or no axial mixing as the particulate polymer travels through the vessel, thus ensuring that the residence time of the particles is substantially uniform. "Plug flow" is sometimes referred to in the art as "mass flow", especially where the flow under consideration is movement of solid particulate materials. An alternative definition is that the flow characteristics of the particulate polymer in the purge vessel are such that the standard deviation of the residence time is preferably not greater than 20%, and even more preferably not greater than 10% of the mean residence time of the particulate polymer in the purge vessel.

Preferably the gas fed to the purge vessel is fed countercurrent to the movement of the particulate polymer.

The particulate polymer from which it is desired to remove volatile material can be, for example, polymer powder, pelletised polymer or granular material which has already been subjected to a primary monomer separation step. In the case that the particulate polymer has been prepared in the presence of a transition metal-containing catalyst, preferably any catalyst residues present in the polymer have been deactivated prior to treating the polymer in accordance with the process of the present invention. Preferably the particulate polymer is polyolefin powder, pellet or granular material having been prepared by polymerisation or (co)polymerisation of one or more monomeric 1-olefins, in the gas phase, the liquid phase (e.g. using so-called "particle form" polymerisation conditions), or the solution phase, or from the high temperature high pressure process (often referred to as the "high pressure process"). Alternatively, the particulate polyolefin can be polyolefin which has been converted into another particulate form, e.g. by granulation or pelletising. Preferably the particulate polyolefin is a pelleted polymer, more preferably a pelleted polyolefin. Accordingly it is also preferred that prior to entry into the purge vessel, the particulate polyolefin has passed through an extruder to be pelletised.

The quantity of volatile material (excluding water) present in the polymer fed to the purge vessel, as measured by chromatography (KWS method, carbon-hydrogen chromatography), is preferably not greater than 500 ppm (parts per million by weight), more preferably not greater than 300 ppm, and even more preferably not greater than 100 ppm. The quantity of volatile material (excluding water) present in the polymer leaving the purge vessel after treatment according to the invention, as measured by chromatography (KWS method, carbon-hydrogen chromatography), is preferably not greater than 300 ppm (parts per million by weight), more preferably not greater than 200 ppm, and even more preferably not greater than 100 ppm. The reduction in the quantity of volatile material (excluding water) present in the polymer leaving the purge vessel after treatment according to the invention compared with that entering the purge vessel, as measured by chromatography (KWS method, carbon-hydrogen chromatography), is greater than 300 ppm (parts per million by weight), more preferably greater than 500 ppm.

This significant reduction in volatile material content has a significantly beneficial effect on the organoleptic properties of the final polymer. The invention can reduce the taste rating of a high density polyethylene according to the KTW method from 2-3 down to 1-1.5.

The particulate polymer fed to the purge vessel can be preheated before entering the purge vessel, or can be heated solely in the purge vessel itself. The particulate polymer can be fed to the preheating vessel intermittently, continuously, as a batch or in batches. Preferably it is fed continuously. Preferably the particulate polymer moves through the preheating vessel in substantially plug-flow mode. The temperature to which the particulate polymer is heated in the preheating vessel may be at least 30° C., and up to 70° C. or higher, provided that the temperature is insufficiently high to cause the particles to become agglomerated. As a rough guide, the temperature should not be greater than about 5° C. below the Vicat softening temperature. The particulate polymer is preferably fed to the heating vessel using a pneumatic conveying technique. If a preheating vessel is employed, it can, if desired, be provided with means to pass a purge gas countercurrent to the movement of the particulate polymer through the vessel. If desired, hot gas, e.g. hot nitrogen, can be used to heat the particulate polymer in the preheating vessel. Alternatively the preheating vessel is heated using conventional industrial equipment, for example, steam or hot water jacketing.

In the case that the particulate polymer is pelletised, the pellet can, if desired, be fed directly from the pelletising machine to the purge vessel, or to the heating vessel if one is employed. Feeding pellet to the purge vessel or to the heating vessel direct from the pelletising machine can make further savings in energy requirements, especially if the pellet discharge from said machine still contains residual heat from the pelletising process. This saving in energy can be optimised, for example, by suitable adjustment of the temperature of the quench water such that the pellet remains relatively hot after the quench, but not so hot that agglomeration of the pellets can occur.

The particulate polymer is fed to the purge vessel in any convenient manner, for example, using pneumatic conveying or by means of gravity feed devices employing suitable feeder valve means between the source and the purge vessel. It is preferred to feed the particulate polymer continuously to the purge vessel.

The residence time of the particles in the vessel is substantially the same for all the particles. Plug flow can be achieved using conventional industrial equipment. Thus it is preferred to employ a purge vessel with smooth internal walls and having uniform cross section throughout a major portion of its length. A frusto-conical or other tapering cross section, for example, at the exit of the purge vessel, can be used provided that the angle of the discharge cone is calculated so as to ensure the plug flow qualities of the vessel (the angle can be calculated from shear test results, and depends on the nature of the particulate polymer being treated). The principles of plug flow are well known in the art and suitable apparatus can be readily designed adopting these principles. The purge vessel is preferably tubular and of substantially uniform cross section. The major portion may take the form, for example, of a tube having square or circular cross section. The purge vessel is most preferably a vertically disposed cylindrical vessel having a conical section at the base which tapers towards an outlet for the polymer located at the bottom of the vessel. Preferably the purge vessel is vertically disposed. Most preferably the purge vessel is of uniform cylindrical cross section throughout a major part of its length, and has a length at least twice its diameter in order to help ensure plug flow.

In one embodiment plug flow is achieved in a cylindrical vessel by selection of a particular valve to control the discharge opening. The valve is in the form of an upturned cone seated on a frustoconical seat, thereby defining an annular passageway when the valve is open. Such an arrangement can prevent rapid discharge of polymer through the centre of the purge vessel, which may result in non-plug flow. When operating with such an arrangement, it is preferred that the valve is not continuously open, but does so intermittently; this has been found to be best to ensure plug flow. Preferably the valve is open half the time; a typical cycle is 1-3 minutes open, with the same amount of time closed, although the exact time will of course depend on the size of the vessel.

The rate of flow and the dimensions of the purge vessel are suitably arranged so that the residence time of the particulate polymer in the purge vessel lies in the range from about 0.5 to 16 hours, preferably 2 to 16 hours, more preferably 6 to 12 hours. For certain applications, at least 10 hours is required.

The temperature to which the particulate polymer is heated in the purge vessel is suitably at least 30° C., preferably at least 50° C., most preferably at least 70° C. or higher, provided that the temperature is insufficiently high to cause the particles to become agglomerated. As mentioned above, as a rough guide, the temperature is preferably not greater than about 5° C. below the Vicat softening temperature. For example, if the Vicat softening temperature is 80° C., the maximum temperature to which the particulate polymer is heated should preferably not be greater than 75° C. In the case that the particulate polymer is high density polyethylene having a density of at least 0.945 kg/m³, the temperature of the heating in the purge vessel is preferably in the range 70 to 100° C. On the other hand, in the case that the particulate polymer is a lower density copolymer, for example, a copolymer of ethylene with a higher 1-olefin, e.g. having a density in the range 0.915 to 0.945 kg/m³, the said temperature preferably lies in the range 60 to 80° C. In any event the temperature must be insufficiently high to cause the particles to become agglomerated. Failure to observe this can result in the polymer becoming blocked in the preheating or purge vessels, or even forming an intractable mass within these vessels.

The particulate polymer may be moved through the purge vessel using any suitable means of motivation, for example using an Archimedean screw device or merely under the influence of gravity. Preferably however the particulate polymer moves under the influence of gravity in response to the discharge of solid from the base of the purge vessel. Preferably the purge vessel is insulated to retain heat during purging.

Gas is preferably passed through the purge vessel counter current to the flow of the particulate polymer therein. By "counter current" is meant that the gas is passed across or against the flow of the particles. The gas is heated prior to injection into the purge vessel. Normally the gas is air. However if desired the air can be supplemented with another gas or gases, for example, nitrogen or carbon dioxide, e.g. if it is desired to reduce any potential risk of fire or explosion. However, the present invention is generally applied to the reduction of volatiles in particulate polymer in which the content of volatiles is already at a relatively low level. Accordingly, the level of volatiles present in the purge gas stream exiting from the purge vessel is normally not more than about 5 milligrams per liter of gas, preferably not more than about 1 milligram per liter of gas. A particularly preferred level is less than 150 g/m³.

The rate of flow of gas through the particulate polymer is maintained at a level below that which would cause disruption of the plug flow of the particulate polymer. This is well below the rate of flow which would cause fluidisation of the particulate polymer. In the case of pelleted polymer, the rate of flow of gas that can be tolerated before the onset of disruption of the plug flow is generally substantially higher than for powdery polymer. In order to provide sufficient heating of the polymer, the rate of flow of gas is preferably at least 80 liters per hour per square centimeter of cross section measured radially across the direction of flow of particulate polymer through the purge vessel (units hereinafter abbreviated to $1.hr^{-1}cm^{-2}$). The maximum flow rate which can be tolerated without disruption of the plug flow is about $150\ 1.hr^{-1}cm^{-2}$.

Although all of the gas may be introduced into the purge vessel close to its bottom and blown upwards through the particulate polymer, this requires the use of significant pressure. We have found that removal of volatiles can be just as effective if the majority of the hot gas is introduced into the purge vessel close to the top where the particulate polymer enters, with only a relatively small proportion of the gas being introduced at the bottom. Introducing gas close to the top of the vessel requires a much lower pressure, as of course does introducing a much smaller mass flow of gas at the bottom. It is believed that this arrangement is just as effective because once the polymer is heated, only a relatively small air flow across it is required in order to remove the volatile compounds. Thus the most efficient means of achieving hot particulate polymer having a flow of gas across it is to introduce the majority of the gas required to heat the polymer close to the top of the vessel. Accordingly it is preferred that at least a portion of the gas entering the purge vessel does so at one or more points close to the top of the purge vessel; and it is preferred that each of said one or more points are located at a level such that less then 20% of the volume of particles in the vessel lie above that level when the vessel contains the maximum quantity of particulate polymer. It is also preferred that no more than 20%, more preferably no more than 10% of the total mass of gas entering the vessel does so close to the bottom of the vessel. In this case, the rate of flow of gas entering the close to the bottom of the vessel is typically at least 0.5 liters per hour per square centimeter of cross section measured radially across the direction of flow of particulate polymer through the purge vessel (units hereinafter abbreviated to $1.hr^{-1}cm^{-2}$). Thus for example, rates of flow of gas from 2 to $10\ 1.hr^{-1}cm^{-2}$ entering at the bottom of the purge vessel are particularly useful. It is also preferred that a portion of the gas introduced close to the top of the purge vessel is discharged directly into the middle of the vessel, optionally through an axially extending conduit. This helps to avoid cold spots in the centre of the vessel. Preferably the mass flow of gas introduced directly into the middle of the vessel is about 20-40%, typically approximately one-third, that introduced into the side of the vessel at the same level. Generally, it will be understood that the precise location of gas entry points, gas flowrates at each entry point and also purge vessel dimensions are calculated in each individual case depending on the particulate polymer being treated, and the flowrate of the polymer, so as to obtain a uniform gas distribution and efficient heating/devolatilising.

Whilst substantially all of the heating of the particulate polymer is caused by the hot gas, the invention does not exclude the possibility of some auxiliary heating means being present, such as a heat exchanger positioned centrally near the top of the purge vessel so as to ensure adequate heating at the centre of the vessel. The pressure in the purge vessel can be any desired pressure, but in practice the use of a pressure close to atmospheric pressure (e.g. slightly above 1 bar absolute but less than 200 mbarg) is generally satisfactory as this avoids the need to use expensive pressure vessels and blowers. In practice the introduction of the purge gas into the purge vessel will generally cause a slight increase of pressure therein.

Volatile materials diffuse from the particulate polymer in the purge vessel into the gas stream and are carried counter current to the movement of the particulate polymer towards the region where the particulate polymer is fed to the vessel. The gas is preferably vented from the purge vessel using suitable piping means. The vented gas containing the volatiles can be fed to a flare stack or, if it is desired to recover any volatile components, for example, it may be fed to a suitable recovery unit. Frequently it is found that the concentration of volatiles is so small (less than 150 mg/m³) that the gas from the purge vessel can be vented direct to the atmosphere. Preferably the process conditions are maintained such that the concentration of any inflammable volatile materials in the gas vented from the purge vessel provide less than 25%, preferably less than 5% of the flammability limit of the gas. The concentration of such volatile materials can be reduced, for example, by reducing one or more of the following: (1) the standing volume of particulate polymer in the purge vessel, (2) the rate of flow of the particulate polymer through the purge vessel and (3) the temperature of the particulate polymer in the purge vessel: or by increasing the rate of flow of the gas through the purge vessel.

The particulate polymer is suitably removed from the purge vessel simply by force of gravity. However this may be assisted by conventional industrial conveying means for particulate materials, for example motorised valves or a rotary airlock. Preferred mechanical withdrawal means include variable rate withdrawal means, for example, variable speed motorised valves or motorised screws. The vessel is preferably equipped with means to detect the quantity or level of particulate polymer therein, for example a means to detect the level of settled particulate polymer in the vessel. Preferably the means to detect the quantity or level of particulate polymer within the vessel is coupled with the variable rate withdrawal means, for example, to maintain a constant volume of particulate polymer within the vessel. The coupling may be achieved, for example, by electronic means or mechanical means.

After the particulate polymer has passed through the purge vessel it is normally still hot and may require cooling before being transferred to storage or undergoing further treatment or processing. For example, in the case of polyethylene, if it is desired to transfer the particulate polymer to storage using dilute or dense phase pneumatic conveying means, it is preferred to cool it to a temperature below about 65° C., typically 40-60° C., before transfer to reduce the possibility of so called "angel hair" forming in the pneumatic conveying lines. The means used to cool the particulate polymer, if any, can comprise, for example, conventional industrial particulate cooling equipment. Air or water cooling may be used. For example, the hot particulate polymer can be fed to a gas fluidised bed cooler operating under batch or continuous conditions. Air used for cooling can subsequently be introduced into the feed of the hot air to be introduced into the purge vessel in order to reduce heating costs.

In one embodiment, the cooling means can be incorporated at the bottom of the purge vessel in order to save on equipment costs; in this case, the design must be such so as to ensure plug flow throughout the purge vessel at least until entry into the cooling portion. Optionally, the gas introduced into the purge vessel to remove volatile materials is initially passed unheated through the bottom of the vessel, where it assists in cooling the hot particulate polymer whilst at the same time being heated. This gas is then further heated to the required temperature, and then reintroduced into the purge vessel at the desired location to contact the polymer.

As has been indicated above, it is preferred to withdraw particulate polymer from the purge vessel using means to withdraw the polymer continuously. Likewise, the preheating vessel and/or the cooling vessel are preferably equipped with means to withdraw the polymer continuously, for example using motorised valves or motorised screws. Preferably the withdrawal means are variable rate withdrawal means, for example, using variable speed motorised valves and/or a vibrating table. The vessel(s) is/are preferably equipped with means to detect the quantity or level of particulate polymer therein, for example a means to detect the quantity or level of settled particulate polymer in the vessel(s). Preferably the means to detect the quantity or level of particulate polymer within the vessel(s) is coupled with the variable rate withdrawal means, for example, to maintain a constant volume of particulate polymer within the vessel(s). The coupling may be achieved, for example, by electronic means or mechanical means.

If desired, the flow of particulate polymer through the cooling vessel can also be plug flow mode. Plug flow of the particulate polymer through the cooling vessel can be achieved by standard industrial means.

Particulate polymer suitably employed in the present invention can be, for example, polymer powders which are the direct products of polymerisation processes, provided that such polymer powders have been substantially freed from unreacted monomer in an earlier separation step, for example, the powder produced from gas fluidised bed polymerization of olefins or from particle form processes for polymerising monomers in a liquid diluent. Preferred polymer particles are polymer pellets which are well known in the art as a standard product employed for the fabrication of polymeric articles. The size of the polymer particles is suitably in the range 0.1 to 10 mm, preferably in the range 2 to 7 mm. For example, polymer pellets employed in the fabrication of plastics articles generally lie in the range 3 to 6 mm.

Preferably the polymer particles comprise one or more polyolefins. Preferred polyolefins are polyethylene, polypropylene, and copolymers of ethylene with one or more $C_3$ to $C_{12}$ alpha olefins. Examples of such polymers are high density polyethylene, medium density polyethylene, linear low density polyethylene and very low density polyethylene (VLDPE).

In one embodiment of the invention, the above process is performed subsequent to a treatment step for reducing the amount of gaseous diluent contain within the raw polymer slurry discharged from the polymerisation reactor. When discharged from the polymerization reactor, raw polymer slurry is in the form of a material containing significant amounts of diluent, smaller amounts of unreacted olefinic monomer(s) and which may contain small amounts of catalyst, cocatalyst, other hydrocarbons and any other material depending on the manufacturing process used (hereafter called under the collective term "contaminants"). After the pressure release, the raw polymer resin is passed into the above mentioned purge bin at about atmospheric pressure, where nitrogen is used to purge these contaminants out. The purge vent stream from this step contains nitrogen, diluent, olefinic monomer, and other process-specific materials.

In order to minimise the amount of diluent transferred from an olefin polymerization reactor to a hydrocarbon purge bin and, optionally, to maximise recovery of said diluent from the purge bin, the following steps are carried out:

continuously discharging from the polymerisation reactor a slurry comprising polyolefin and diluent;

submitting said slurry to a pressure release such that the diluent is evaporated and a polyolefin/gas mixture is formed;

continuously discharging said polyolefin/gas mixture into a collecting vessel;

opening the intake valve of a concentrator vessel comprising also a discharge valve in such a way that a predetermined volume of said polyolefin/gas mixture is transferred into said concentrator vessel;

closing the intake valve of the concentrator vessel;

opening the discharge valve of said concentrator vessel in such a way that said polyolefin/gas mixture is transferred into the hydrocarbon purge bin.

An advantage of the above sequence of steps is that, instead of transferring the polyolefin/gas mixture directly from the polymerization reactor—respectively directly from the collecting vessel—to the purge bin together with a significant quantity of gas from the polymerization reactor, a concentrator vessel is used between the polymerization reactor respectively between the collecting vessel and the purge bin. The quantity of gas transferred from the polymerization reactor to the purge bin is thus minimized. Usually, the polymerization reactor is under high pressure (10-40 bars) whereas the purge bin is at a pressure close to the atmospheric pressure. The less effluent gas is taken out of the collecting vessel, the less gas must be recycled and pressurized to the higher pressure required in the polymerization reactor. The use of the concentrator vessel as described above allows to decrease the quantity of gas that is transferred to the low pressure side i.e. to the purge bin. For instance, when isobutane is used as diluent for the polymerization and when the pressure in the second step of the process of the invention drops to about 10 bar, the quantity of gas transferred to the purge bin is reduced to about 2.5 weight %. Consequently the compressors can be of smaller size, they are thus less costly to buy and to operate. Furthermore, since the quantity of unreacted monomer and solvent that must be recycled is smaller, the downstream recycling equipment may be smaller and less energy-consuming.

A preferred option is that instead of using one concentrator vessel, two concentrator vessels are used in parallel.

In the first part of the cycle, the first concentrator vessel is filled with the polyolefin/gas mixture and the intake valve of the first concentrator vessel is closed. Before the first concentrator vessel is emptied into the purge bin, a pressure compensation valve connecting the two concentrator vessels is opened. Gas contained in the first concentrator vessel is transferred to the second concentrator vessel until the pressure in the two concentrator vessels is about the same. The pressure compensation valve between the concentrator vessels is then closed and the first concentrator vessel is emptied into the purge bin. The pressure inside the first concentrator vessel drops to the pressure inside the purge bin whereas the pressure in the second concentrator vessel is higher than the pressure inside the purge bin but lower than the pressure in the collecting vessel, i.e. about 30-50% lower.

In the second part of the cycle, the second concentrator vessel will be filled with the polyolefin/gas mixture from the collecting vessel and the pressure between the two concentrator vessels is equilibrated by opening the pressure compensation valve connecting the two concentrator vessels. The second concentrator vessel will eventually be emptied into the purge bin.

The method using two concentrator vessels in parallel reduces the quantity of gas transferred from the polymerization reactor—respectively form the collecting vessel—to the low pressure side i.e. to the purge bin still further. For instance, when isobutane is used as diluent for the polymerization and when the pressure in step (b) drops to about 10 bar, the quantity of gas transferred to the purge bin is reduced to about 1 weight %. These figures depend on the bulk density of the polymer and on the density of the gas.

A further option includes the following steps to treat the purge vent stream from the purge bin:

compressing and cooling a purge vent stream from a purge bin, resulting in partial condensation of the stream, thereby dividing the stream into a condensed portion enriched in monomer and an uncondensed portion enriched in purge gas;

dividing the uncondensed portion into two parts, recirculating the first part of the uncondensed portion to the purge bin;

treating the second part of the uncondensed portion in a separation unit, to create a more-enriched purge gas stream and a mixed stream;

recirculating the enriched purge gas stream from the separation unit at the bottom or at an intermediate level of the purge bin and recirculating the mixed stream from the separation unit to the condensation step, by returning them to the purge vent stream upstream of the compression.

The process for treating the purge vent stream is very economical. Indeed, since the quantities and the concentration of monomers and other recyclable products coming from the purge bin are smaller than in traditional processes, the equipment, i.e. the compression/cooling and separation units need not be very large. They are less costly to buy and to operate.

Furthermore, to recycle the first part of the uncondensed portion directly to the purge bin further reduces the size, costs and energy consumption of the equipment. The condensation step is preferably carried out at a pressure comprised between about 8 to 20 bar; when isobutane is used as diluent for the polymerization, said pressure is typically comprised between 12 and 16 bar. The condensation step is preferably further carried out at a temperature comprised between −30 and +50° C.; when isobutane is used as diluent for the polymerization, said temperature is typically comprised between 5 and 15° C.

The separation unit may comprise a membrane separation unit, a cryogenic separation unit, an absorption unit, etc. In the case of a cryogenic separation, the unit comprises a distillation column with a condenser operating at low temperature, for instance in the range of −50 to −100° C.

The separation by means of a membrane is preferred. It is preferably carried out by using a membrane that has a selectivity for the faster permeating component—i.e. the olefin—over the other component—i.e. the purge gas—of at least about 5. It should be noted that the above process for minimizing the quantity of gas which is transferred from a polymerization reactor to a hydrocarbon purge bin, can be applied to any polymer manufacturing operation.

BRIEF DESCRIPTION OF THE DRAWINGS

The present invention will now be illustrated with reference to the accompanying drawings wherein.

DETAILED DESCRIPTION OF EMBODIMENTS

Figure 1:
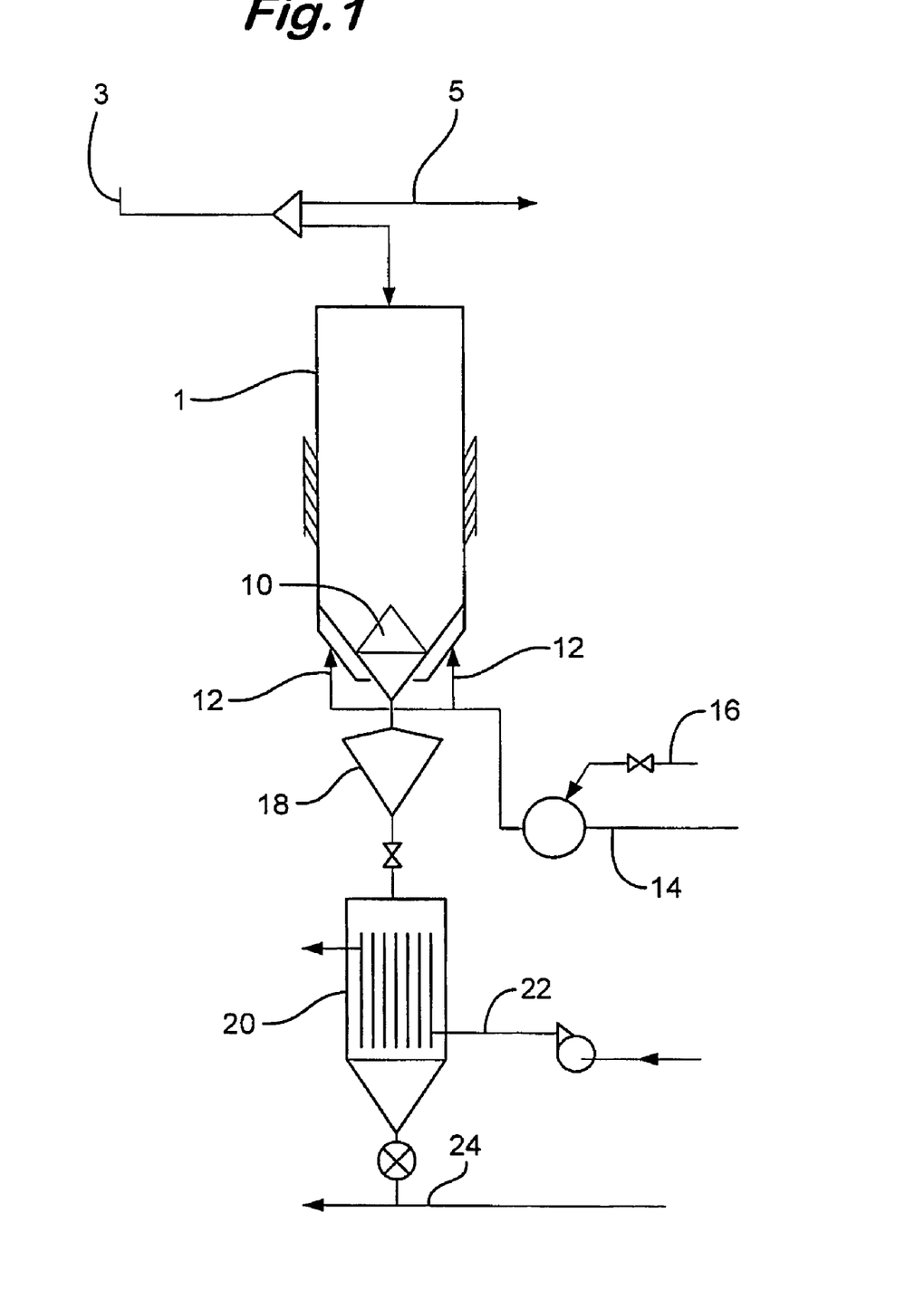
FIG. 1 represents diagrammatically a first embodiment of apparatus for reducing the volatiles content of linear high density polyethylene (HDPE) pellets prepared from HDPE powder made by the gas phase fluidised bed polymerisation of ethylene.

FIG. 1 shows a purge vessel 1, to which is fed from an extruder (not shown) a continuous stream of pellets via inlet pipe 3, with any excess being transferred to a buffer silo via line 5. In this particular example, the pellets are introduced at a rate of 6 tonnes/hour, and purge vessel 1 has a diameter of 4.5 m and an internal volume of 150 m$^3$. Hot air from line 14 is introduced at points 12, having been heated by steam from line 16. This air blows upwards through the mass of pellets, and maintains the temperature inside the purge vessel at 90° C. Plug flow is ensured by the discharge valve, which is in the form of an upturned cone. In this particular embodiment, the valve is not continuously open, but instead opens and closes for 2 minutes at a time. It was found that in this arrangement such a regime ensured plug flow. The treated pellet discharges into hopper 18 and thence into a cooling vessel 20, which is cooled to 40-60° C. by water from line 22. Finally, the cooled pellets are discharged into an air conveyor line 24.

Figure 2:
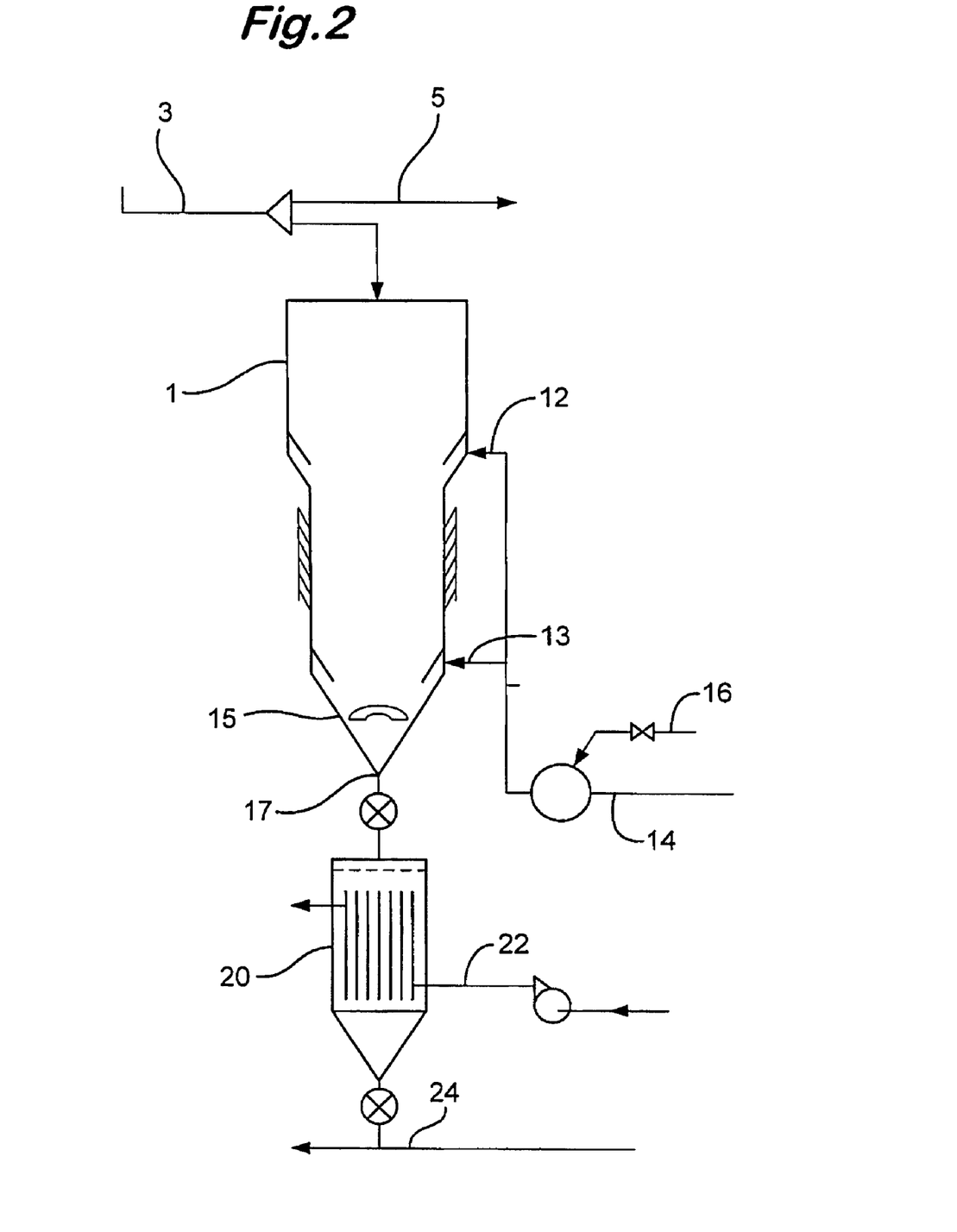
FIG. 2 shows a similar embodiment to FIG. 1 in which the purge vessel has a different system of both discharge and hot air input.

In FIG. 2 a similar arrangement is shown, with a purge vessel 1, fed continuously from an extruder via inlet pipe 3. In this example the rate of pellet feed is 30 tonnes/hour, and the purge vessel 1 has a greater internal volume of 700 m$^3$, and a different system of both discharge and hot air input. Hot air from line 14, heated by steam from line 16, is introduced at separate points 12 and 13. In this particular example, the relative rates of input are 17 kg/s at point 12 and 1 kg/s at point 13. It should be noted that points 12 and 13 are representative of a number of inlets, typically 3-5, spaced around the diameter of the purge vessel at the same level. Introducing the major proportion of hot air at point 12 ensures that the pellets are satisfactorily heated when as they enter the purge vessel; further inlets can be provided to introduce hot air into the centre of the vessel at the same level so as to ensure homogeneous heating. It has been found that introducing a substantial flow of air at the top of the vessel means that only a small flow is required at the bottom at point 13, where a relatively greater pressure is required. As in the example of FIG. 1, the temperature inside the purge vessel is maintained at 90° C. Residence time for HDPE pellets is typically 10-12 hours. The manner of discharge from the vessel 1 is also different from that of FIG. 1. Instead of an internal valve arrangement, there is a continuous discharge through opening 17, with plug flow being ensured by calculation of the dimensions and angle of tapered portion 15 of the purge vessel. As before, the treated pellet discharges into a cooling vessel 20, which is cooled to 40-60° C. by water from line 22. The cooled pellets are then discharged into an air conveyor line 24.

EXAMPLES

Example 1

The process as described above in connection with FIG. 1 was conducted on a a stream of pellets of high density polyethylene. Table 1 below shows the content of volatile material (excluding water) present in the polymer entering the purge vessel, and the content leaving it after treatment according to the invention, as measured by chromatography (KWS method on pellets, carbon-hydrogen chromatography at 200° C. up to C16). It can be seen that a significant reduction in volatile material content is achieved by the process of the present invention: a reduction of over 500 ppm is possible.

TABLE 1

| volatile material content | | |
| --- | --- | --- |
| Before treatment (ppm) | After treatment (ppm) | Reduction (ppm) |
| 546 | 195 | 351 |
| 496 | 89 | 407 |
| 550 | 94 | 456 |
| 646 | 98 | 548 |
| 732 | 143 | 589 |
| 601 | 122 | 479 |
| 456 | 83 | 373 |
| 532 | 90 | 442 |
| 543 | 172 | 371 |
| 621 | 114 | 507 |
| 649 | 143 | 506 |
| 564 | 121 | 443 |
| 552 | 116 | 436 |
| 474 | 142 | 332 |

The invention claimed is:

1. A process for the separation of volatile material from particulate polymer discharged from a polymerisation reactor in the form of a polymer slurry, comprising:

(a) feeding the particulate polymer which has been substantially freed from unreacted monomer in an earlier separation step using an inert gas to a purge vessel and causing it to move through the vessel in substantially plug-flow mode;

(b) heating the particulate polymer in the purge vessel to a temperature greater than 30° C. but insufficiently high to cause the polymer particles to become agglomerated, and/or maintaining the polymer at a temperature in this range in the purge vessel;

(c) feeding gas to the purge vessel to remove volatile material therefrom, removing the particulate polymer from the purge vessel;

wherein substantially all of the heating of the polymer particles which occurs in the purge vessel is accomplished by preheating the gas fed into the purge vessel, and the polymer slurry discharged from the polymerisation reactor is submitted to a pressure release such that diluent is evaporated and a polyolefin/gas mixture is formed in a collecting vessel, and a concentrator vessel is used between the collecting vessel and the purge vessel.

2. Process according to claim 1, wherein the polymer slurry is continuously discharged from the polymerisation reactor.

3. Process according to claim 2 wherein the polymer is a polyolefin and is transferred from the polymerisation reactor to the purge vessel by:

continuously discharging from the polymerisation reactor a slurry comprising polyolefin and diluent;

continuously discharging said polyolefin/gas mixture into a collecting vessel;

opening the intake valve of a concentrator vessel comprising also a discharge valve in such a way that a predetermined volume of said polyolefin/gas mixture is transferred into said concentrator vessel;

closing the intake valve of the concentrator vessel;

opening the discharge valve of said concentrator vessel in such a way that said polyolefin/gas mixture is transferred into the purge vessel.

4. Process according to claim 1, wherein the diluent in the slurry discharged from the polymerisation reactor is isobutane.

5. Process according to claim 4, wherein the pressure in the collecting vessel is about 10 bar, and the quantity of gas transferred to the purge vessel is about 2.5 weight %.

6. Process according to claim 1 wherein two concentrator vessels are used in parallel.

7. Process according to claim 6, wherein the diluent in the slurry discharged from the polymerisation reactor is isobutane, the pressure in the collecting vessel is about 10 bar, and the quantity of gas transferred to the purge vessel is about 1 weight %.

8. Process according to claim 1 wherein the particulate polymer fed to the purge vessel is preheated before entering the purge vessel.

9. Process according to claim 1, comprising the additional steps of:

compressing and cooling the stream of gas discharged from the purge vessel, so as to partially condense of the stream to form a condensed portion enriched in monomer and an uncondensed portion enriched in purge gas;

dividing the uncondensed portion into two parts, recirculating the first part of the uncondensed portion to the purge vessel;

treating the second part of the uncondensed portion in a separation unit, to create a stream further enriched in purge gas and a mixed stream;

recirculating the enriched purge gas stream from the separation unit at the bottom or at an intermediate level of the purge vessel; and recirculating the mixed stream from the separation unit to the condensation step, by returning it to the stream of gas discharged from the purge vessel upstream of the compression.

10. Process according to claim 9 wherein the condensation step is carried out at a pressure between 8 and 20 bar.

11. Process according to claim 9 wherein the condensation step is carried out at a temperature between −30 and +50° C.

12. Process according to claim 9, wherein the separation unit is a membrane separation unit, a cryogenic separation unit or an absorption unit.

13. A process for the separation of volatile material from particulate polymer which has been substantially freed from unreacted monomer in an earlier separation step of pressure release such that diluent is evaporated and a polyolefin/gas mixture is formed in a collecting vessel, and a concentrator vessel is between the collecting vessel and the purge vessel, comprising:

(a) feeding the particulate polymer to a purge vessel and causing it to move through the vessel in substantially plug-flow mode;

(b) heating the particulate polymer in the purge vessel to a temperature greater than 30° C. but insufficiently high to cause the particles to become agglomerated, and/or maintaining the polymer at a temperature in this range in the purge vessel;

(c) feeding gas to the purge vessel to remove volatile material therefrom, removing the particulate polymer from the purge vessel;

wherein substantially all of the heating of the particles which occurs in the purge vessel is accomplished by preheating the gas fed into the purge vessel.

* * * * *